(12) United States Patent
Green et al.

(10) Patent No.: US 12,005,514 B2
(45) Date of Patent: *Jun. 11, 2024

(54) RECIP BLADE

(71) Applicant: BLACK & DECKER INC., Towson, MD (US)

(72) Inventors: Matthew C. Green, Amherst, MA (US); Stephen A. Hampton, East Longmeadow, MA (US); William B. Korb, Broad Brook, CT (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,554

(22) Filed: Jan. 20, 2023

(65) Prior Publication Data

US 2023/0182220 A1 Jun. 15, 2023

Related U.S. Application Data

(63) Continuation of application No. 15/855,325, filed on Dec. 27, 2017, now Pat. No. 11,583,945, which is a continuation of application No. 14/563,540, filed on Dec. 8, 2014, now abandoned.

(51) Int. Cl.
*B23D 61/12* (2006.01)

(52) U.S. Cl.
CPC ......... *B23D 61/121* (2013.01); *B23D 61/128* (2013.01)

(58) Field of Classification Search
CPC ....... B23D 61/121; B23D 61/128; B23D 6/12
USPC .................................................. 83/848–851
See application file for complete search history.

(56) References Cited

U.S. PATENT DOCUMENTS

| | | | |
|---|---|---|---|
| 2005/0211046 A1* | 9/2005 | Thomas | B23D 61/121 83/835 |
| 2008/0307936 A1* | 12/2008 | Elliston | B23D 61/121 83/13 |
| 2011/0271815 A1* | 11/2011 | Elliston | B23D 61/121 83/835 |

* cited by examiner

*Primary Examiner* — Nhat Chieu Q Do
(74) *Attorney, Agent, or Firm* — Scott B. Markow

(57) ABSTRACT

A recip blade has a cutting edge defining a cutting direction and a repeating pattern of cutting teeth. Each repeating pattern includes (i) a leading tooth with respect to the cutting direction that includes a rake face defining a first rake angle that is negative, and (ii) a trailing tooth following the leading tooth with respect to the cutting direction that includes a rake face defining a second rake angle that is less negative than the first rake angle.

20 Claims, 6 Drawing Sheets

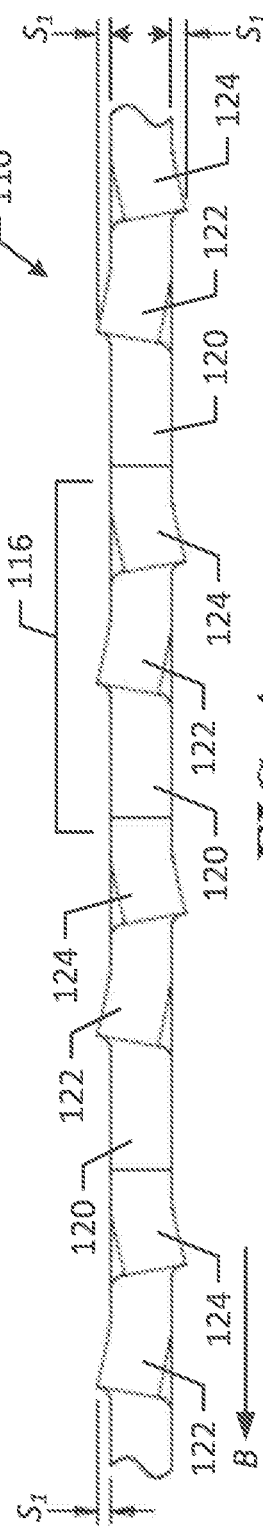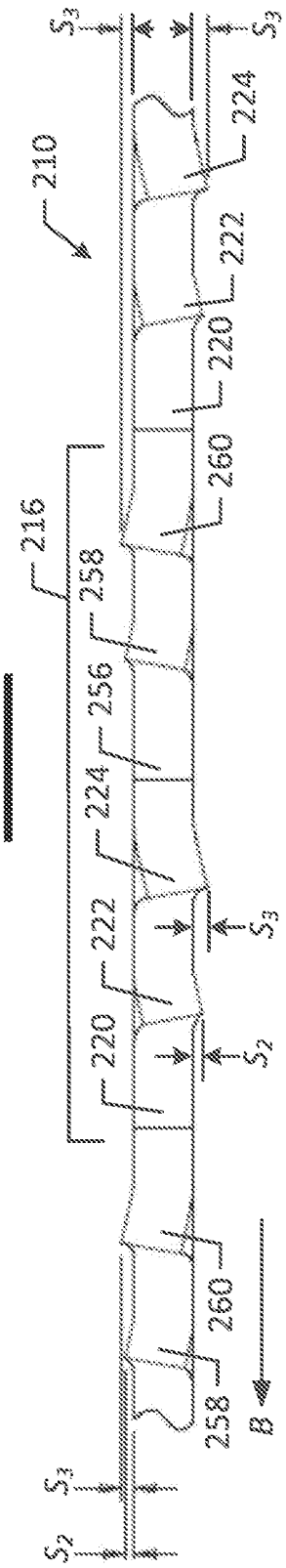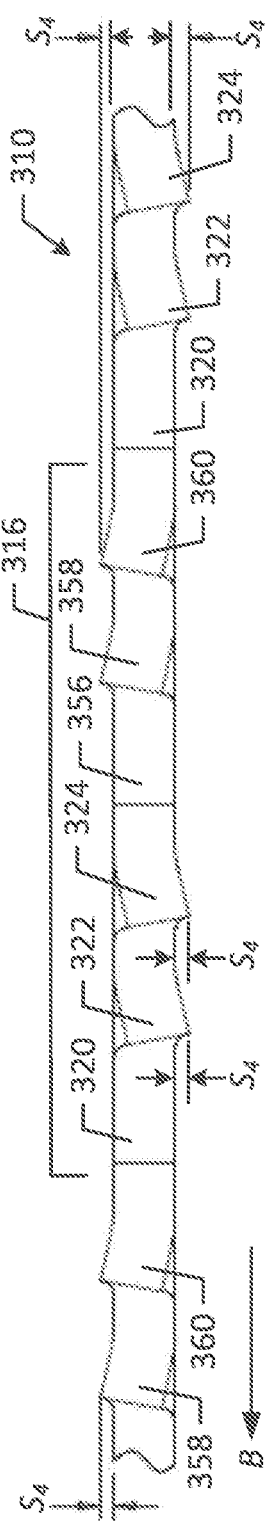

FIG. 6

Average Cutting Time and Attribute Data for Burr

| | Group 1 | Group 2 | Group 3 | Group 4 |
|---|---|---|---|---|
| Raker of Raker Tooth | -7° | -7° | -7° | -7° |
| Rake of Set Teeth | 0° | 0° | -7° | -7° |
| High Low | Yes | Yes | No | No |
| Set Pattern | LLSRRS | LLSRRS | LLSRRS | LLSRRS |
| Variable Set or Constant Set | Variable | Constant | Constant | Constant |

Reciprocating Saw — Time/Sec

| | Group 1 | Group 2 | Group 3 | Group 4 |
|---|---|---|---|---|
| Bosch | 4.31 | 4.81 | 4.77 | 5.33 |
| Milwaukee | 3.12 | 2.93 | 3.02 | 3.85 |
| Hitachi | 3.92 | 4.13 | 4.65 | 5.66 |
| Average Time | 3.78 | 3.96 | 4.15 | 4.95 |

Attribute Data: Presence of Burr

| | Group 1 | Group 2 | Group 3 | Group 4 |
|---|---|---|---|---|
| Inside Burr | 2 | 0 | 14 | 30 |
| Outside Burr | 18 | 17 | 23 | 29 |

Variable Data: Burr Size (Only One Measurement Per Group)

| | Group 1 | Group 2 | Group 3 | Group 4 |
|---|---|---|---|---|
| Inside Length | 0.006 | 0.000 | 0.152 | 0.274 |
| Inside Width | 0.001 | 0.000 | 0.027 | 0.024 |
| Outside Length | 0.148 | 0.155 | 0.259 | 0.244 |
| Outside Width | 0.021 | 0.026 | 0.037 | 0.037 |

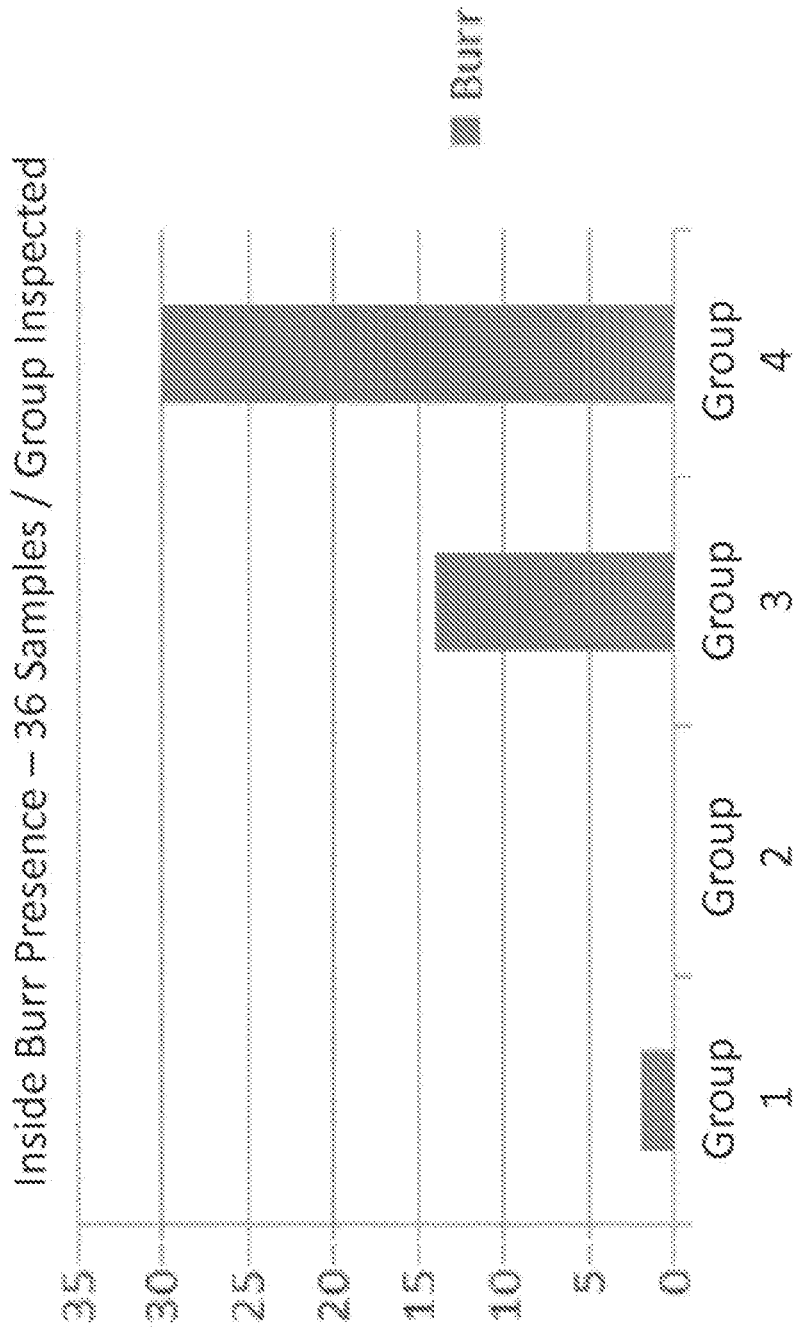

RECIP BLADE

CROSS-REFERENCE TO RELATED APPLICATIONS

This application claims the benefit under 35 U.S.C. § 120 as a continuation of U.S. patent application Ser. No. 15/855,325. Titled "Recip Blade," filed Dec. 27, 2017, now U.S. Pat. No. 11,583,945, which is a continuation of U.S. patent application Ser. No. 14/563,540, titled "Recip Blade," filed Dec. 8, 2014, now abandoned, each of which is hereby expressly incorporated herein by reference for all purposes in their entirety.

FIELD OF THE INVENTION

The present invention relates to saw blades, and more particularly, to recip or jig saw blades with cutting teeth defining negative rake angles.

BACKGROUND INFORMATION

A reciprocating saw machine is a hand-held power saw that includes a chuck for releasably engaging the saw blade and driving the saw blade in a reciprocating motion through a work piece. The reciprocating motion can be an orbital cutting action, a straight or linear cutting action, or an angled cutting action. Reciprocating saws are sometimes referred to as recip saws, or jig saws, and reciprocating saw blades likewise are sometimes referred to as recip blades or jig saw blades. Unless indicated otherwise, the term recip blade is used herein synonymously with the terms reciprocating saw blade and jig saw blade. Reciprocating saws are typically driven by electric motors (e.g., cord or cordless saws), or are pneumatically driven.

A typical reciprocating saw blade includes a blade portion having a cutting edge defined by a plurality of teeth axially spaced relative to each other along one side of the blade, and a non-working edge formed on an opposite side of the blade relative to the cutting edge. A tang for releasably connecting the blade to the chuck of a reciprocating saw extends from an inner end of the blade. The teeth of a reciprocating saw blade typically include a cutting tip, a rake face formed on one side of the tip, and a clearance surface extending from the tip and formed on an opposite side of the tip relative to the rake face. The rake face forms a rake angle relative to an axis perpendicular to a reference plane, which may be defined by the plane extending between the tips of successive teeth having substantially the same height, such as successive unset teeth. A zero degree (0°) rake angle is aligned with the perpendicular axis, a negative rake angle extends forwardly relative to the perpendicular axis with respect to the cutting direction of the blade, and a positive rake angle extends rearwardly relative to the perpendicular axis with respect to the cutting direction of the blade. The clearance surface forms a clearance angle relative to the reference plane.

One of the drawbacks of certain prior art recip or jig saw blades is that they do not provide as long a blade life as desired. In order to overcome this drawback, certain prior art recip or jig saw blades employ negative rake angles on the cutting teeth in order to make the blade robust and improve blade life. However, one of the drawbacks of such prior art recip or jig saw blades is that they can generate excessive burrs or burrs of excessive size when cutting metal work pieces. Generation of excessive burrs or burrs of excessive size can be undesirable because electrical codes generally require that cuts in a conduit be completely burr-free. Creation of excessive burrs or burrs of excessive size can thus require additional effort and expense in deburring the metal work pieces prior to use.

Accordingly, it is an object of the present invention to overcome one or more of the above-described drawbacks and/or disadvantages of the prior art.

SUMMARY OF THE INVENTION

In accordance with one aspect, the present invention is directed to a recip blade comprising a cutting edge defining a cutting direction and a repeating pattern of cutting teeth. Each repeating pattern includes (i) a leading tooth with respect to the cutting direction that includes a rake face defining a first rake angle that is negative, and (ii) a trailing tooth following the leading tooth with respect to the cutting direction that includes a rake face defining a second rake angle that is less negative than the first rake angle.

In some embodiments of the invention, the second rake angle is 0° or greater. In some such embodiments, the first rake angle is within the range of about −1° and about −10°, and preferably is within the range of about −2° and about −8°.

In some embodiments of the invention, each repeating pattern includes at least three trailing teeth following the leading tooth. At least one trailing tooth is set to one side of the blade with respect to the cutting direction, and at least one other trailing tooth is set to an opposite side of the blade with respect to the cutting direction. In some such embodiments, each repeating pattern includes two trailing teeth set to one side of the blade with respect to the cutting direction, and two trailing teeth set to an opposite side of the blade with respect to the cutting direction. In some such embodiments, each repeating pattern includes two consecutive trailing teeth set to one side of the blade, and two consecutive trailing teeth set to an opposite side of the blade. In some embodiments of the invention, each repeating pattern includes a plurality of trailing teeth that are lower in height than the leading tooth. In some embodiments, each leading tooth defines a first rake angle within the range of about −2° to about −8°, and each trailing tooth defines a second rake angle of about 0° or greater.

In some embodiments of the invention, the leading tooth defines a relatively coarse pitch, and the trailing tooth defines a relatively fine pitch. In some embodiments, each repeating pattern defines a plurality of pitches, and the leading tooth defines a coarser pitch than at least a plurality of the trailing teeth. In some embodiments, the finer the pitch of the trailing tooth, the more negative is the rake angle of the leading tooth. In some embodiments, each repeating pattern includes a plurality of trailing teeth defining a pitch within the range of about 21 teeth per inch ("TPI"), or finer, and the respective leading tooth defines a first rake angle within the range of about −6° to about −9°. In some embodiments, each repeating pattern includes a plurality of trailing teeth defining a pitch within the range of about 16 TPI to about 21 TPI, and the respective leading tooth defines a first rake angle within the range of about −4° to about −6°. In some embodiments, each repeating pattern includes a plurality of trailing teeth defining a pitch within the range of about 12 TPI to about 16 TPI, and the respective leading tooth defines a first rake angle within the range of about −1° to about −4°.

In some embodiments of the invention, the leading tooth defines a first rake face, a first primary clearance surface, and a first included angle between the first rake face and first primary clearance surface. The trailing tooth defines a second rake face, a second primary clearance surface, and a second included angle between the second rake face and the second primary clearance surface. Preferably, the first included angle is greater than the second included angle. In some such embodiments, the first primary clearance angle is greater than the second primary clearance angle. In some such embodiments, each primary clearance surface defines a primary clearance angle within the range of about 35° to about 50°.

In some embodiments of the invention, each repeating pattern includes a first unset leading tooth and a plurality of second set trailing teeth. In some such embodiments, the set and unset teeth define a height differential prior to set within the range of about 0.002 inch to about 0.008 inch.

In some embodiments of the invention, each repeating pattern includes a plurality of teeth set to a left side of the blade, and a plurality of teeth set to a right side of the blade. In some such embodiments, the left set teeth include a relatively light set tooth and a relatively heavy set tooth, and the right set teeth include a relatively light set tooth and a relatively heavy set tooth. In some such embodiments, the relatively light set teeth are taller than the relatively heavy set teeth. In some such embodiments, the height differential between the relatively light and heavy set teeth is within the range of about 0.002 inch to about 0.005 inch prior to set. In some embodiments, the relatively heavy set teeth define less negative rake angles than the relatively light set teeth.

In some embodiments of the invention, each repeating pattern includes two consecutive trailing teeth set to a first side of the blade, a consecutive unset tooth trailing the two set teeth, and two consecutive set teeth trailing the unset tooth and set to a second side of the blade opposite the first side of the blade. In some such embodiments, all of the set teeth define the same level of set. In other embodiments, the two left set teeth include a first relatively light left set tooth followed by a second relatively heavy left set tooth, and the two right set teeth include a first relatively light right set tooth followed by a second relatively heavy right set tooth. In some such embodiments, the left heavy set tooth defines a lower height prior to tooth set than the left light set tooth, and the right heavy set tooth defines a lower height prior to tooth set than right light set tooth.

In accordance with another aspect, the present invention is directed to a recip blade for cutting a metal work piece comprising a cutting edge defining a cutting direction and a repeating pattern of cutting teeth. Each repeating pattern includes (i) first means for enhancing the life of the blade, and (ii) second means trailing the first means with respect to the cutting direction for substantially preventing or reducing the size of any burrs generated in cutting the metal work piece.

In some embodiments of the invention, the first means is a leading tooth with respect to the cutting direction that includes a rake face defining a first rake angle that is negative, and the second means is a trailing tooth following the leading tooth with respect to the cutting direction that includes a rake face defining a second rake angle that is less negative than the first rake angle. In some such embodiments, the second means is further defined by a plurality of trailing teeth, wherein at least one of the trailing teeth is set to one side of the blade with respect to the cutting direction, and another of the trailing teeth set to an opposite side of the blade with respect to the cutting direction.

One advantage of the present invention is that the negative rake angle of the leading tooth allows for a relatively robust and long-lasting blade. Another advantage is that the trailing tooth, or plural trailing teeth, define a less negative rake angle than the leading tooth, such as a zero degree (0°) or positive rake angle, and thereby allow for a significantly reduced number of burrs and/or a reduction in burr size, and an improved and smoother surface finish when cutting metal work pieces, in comparison to the above-mentioned prior art recip blades.

Other objects and advantages of the present invention, and/or of the currently preferred embodiments thereof, will become more readily apparent in view of the following detailed description of preferred embodiments and accompanying drawings.

BRIEF DESCRIPTION OF THE DRAWINGS

FIG. 3 is a partial, top plan view of a reciprocating saw blade having a repeating pattern of cutting teeth including an unset tooth followed by right and left set teeth;

FIG. 4 is a partial, top plan view of an alternative embodiment of a reciprocating saw blade having a repeating pattern of cutting teeth including an unset tooth following by a relatively light left set tooth, a relatively heavy left set tooth, an unset tooth, a relatively light right set tooth, and a relative heavy right set tooth;

FIG. 5 is a top plan view of an alternative embodiment of a reciprocating saw blade having a repeating pattern of cutting teeth including an unset tooth following by a pair of left set teeth, an unset tooth, and a pair of right set teeth;

FIG. 6 is a chart showing testing data comparing embodiments of the disclosed recip blade against alternative configurations;

FIG. 7 is a graphical representation of data presented in FIG. 6 with respect to the presence of burr produced during testing.

DETAILED DESCRIPTION OF PREFERRED EMBODIMENTS

Figure 1:
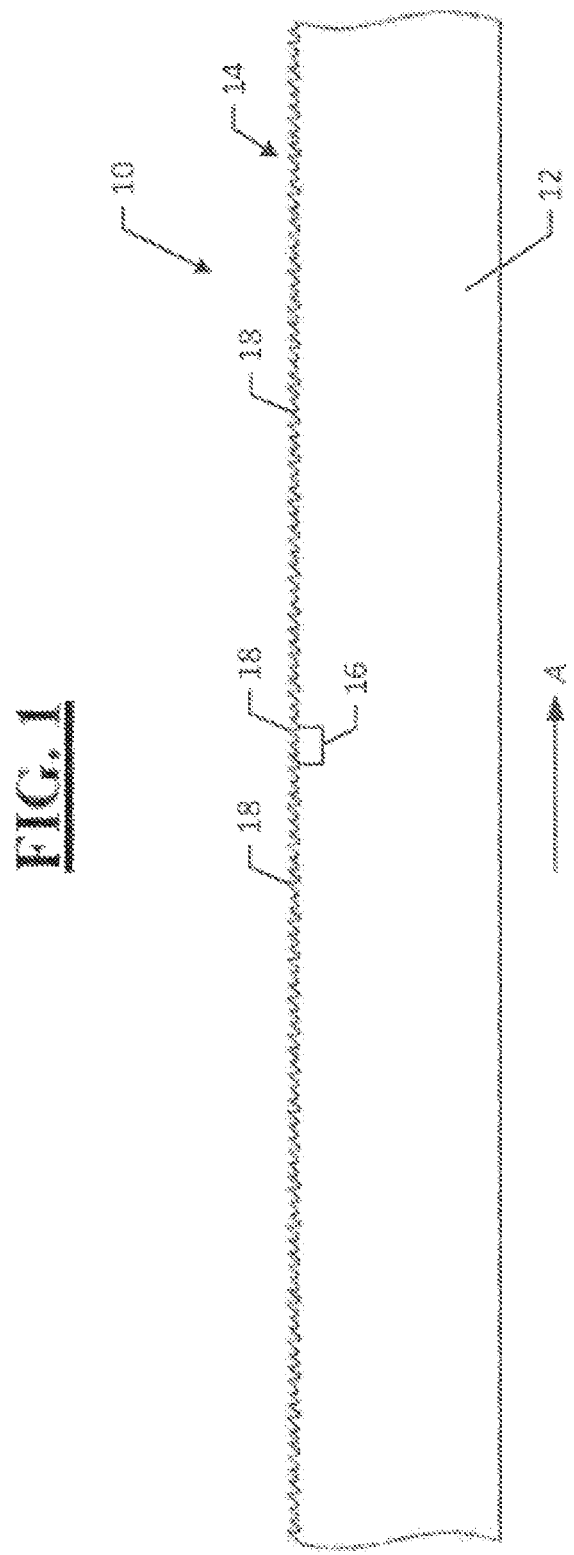
FIG. 1 is a partial, side elevational view of an embodiment of a reciprocating saw blade having a repeating pattern of cutting teeth.
Figure 2:
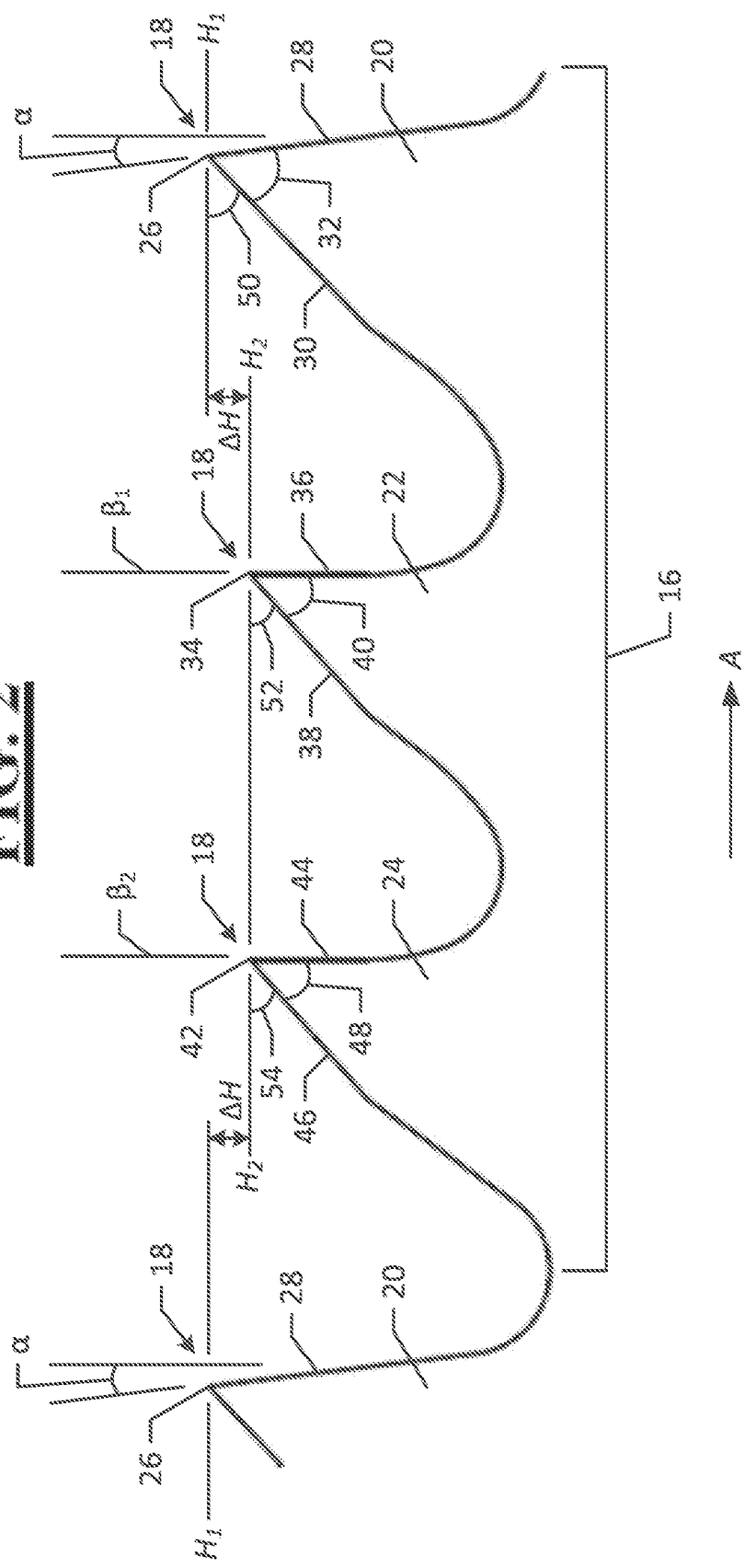
FIG. 2 is a partial, side elevational view of the repeating pattern of cutting teeth of the reciprocating saw blade of FIG. 1.

In FIG. 1, an embodiment of a reciprocating saw blade of the present invention is indicated generally by the reference numeral 10. The recip blade 10 comprises a blade body 12 and a cutting edge 14. The cutting edge 14 defines a cutting direction "A" and includes a repeating pattern 16 of cutting teeth 18. As shown in FIG. 2, the repeating pattern 16 comprises three teeth in the pattern, with a leading tooth and at least one trailing tooth (e.g., two trailing teeth as shown in the example of FIG. 2), as described further herein. Although FIGS. 1 and 2 show a repeating pattern of three teeth, the repeating pattern may include as few as two teeth and may include more than three teeth. For example, in some embodiments described herein, the repeating pattern may include six teeth, and those skilled in the art will appreciate that the repeating pattern may include any number of teeth to form a repeating pattern of cutting teeth on a cutting edge of a blade.

As shown in FIG. 2, repeating pattern 16 includes three cutting teeth 18. A leading tooth 20, which is leading with respect to the cutting direction A, and two trailing teeth 22 and 24 following the leading tooth 20 with respect to the cutting direction A. The leading tooth 20 includes a tip 26, a rake face 28 defining a first rake angle α, a primary clearance surface 30, and an included angle 32. The first trailing tooth 22 includes a tip 34, a rake face 36 defining a second rake angle β1, a primary clearance surface 38, and an included angle 40. The second trailing tooth 24 includes a tip 42, a rake face 44 defining another second rake angle β2, a primary clearance surface 46, and an included angle 48. In FIG. 2, the profiles of the trailing teeth 22 and 24 are the same such that tips 34 and 42 are at the same height, second rake angles β1 and β2 define the same angle (i.e., a second rake angle β), and included angles 40 and 48 define the same angle.

The first rake angle α of leading tooth 20 is a negative rake angle. The second rake angles $\beta_1$ and $\beta_2$ of the trailing teeth 22 and 24 are each less negative rake angles than the first rake angle α. The first rake angle α is preferably within the range of about −1° and about −10°, and in some embodiments, the first rake angle α is within the range of about −2° and about −8°. As shown in FIG. 2, the second rake angles $\beta_1$ and $\beta_2$ are about 0°. However, in some embodiments, the second rake angles $\beta_1$ and $\beta_2$ may be positive rake angles or negative rake angles, which in each case is less negative than the first rake angle α of the leading tooth 20. Although in the illustrated embodiments the second rake angles in each respective repeating pattern are all approximately the same, they need not be the same, and some second rake angles may be different than other second rake angles within the same or different repeating patterns. The first rake angle α, which is negative, enhances the life of the blade, such as by increasing the number of cuts of the blade. The trailing teeth, which have less negative rake angles $\beta_1$ and $\beta_2$, minimize and/or reduce the size of any burrs generated in cutting metal work pieces. Accordingly, the combination provided by the tooth pattern 16 can provide both improved blade life, a reduction in burrs, and a smoother finish.

As noted, the trailing teeth 22 and 24 define tooth heights that are lower than the height of the leading tooth 20. On the cutting edge 14, the tips of the leading teeth 20 of each pattern 16 define a first height $H_1$ and the tips of the trailing teeth 22, 24 define a second height $H_2$. The second height $H_2$ of the trailing teeth 22, 24 is lower than the first height $H_1$ of the leading teeth 20 by a height differential ΔH. The height differential ΔH is preferably within the range of about 0.002 inches (0.05 mm) to about 0.008 inches (0.20 mm). The height differential ΔH is the difference between the heights of the leading tooth 20 and the trailing teeth 22, 24 prior to, and not after, tooth set (if the teeth are set on the blade, as described below).

Although in the illustrated embodiment the trailing teeth 22, 24 have the same height H2, they may alternatively define any combination of height differentials; preferably, however, the second heights H2 of each of the trailing teeth 22, 24 are lower than the first height H1 of the leading tooth 20 of the respective pattern 16. Thus, preferably, the leading tooth 20 defines a relatively high tooth, and the trailing teeth 22, 24 define relatively low teeth. The height differential ΔH between the high and low teeth may be varied depending upon a variety of factors, such as the type of material to be cut, the materials of construction of the saw blade, and the desired cutting performance, such as the desired cutting speed and/or the desired blade life. Accordingly, the tooth heights and height differentials described herein are only exemplary and can be changed as desired, or otherwise as deemed necessary to meet the requirements of a particular application.

Each tooth 18 in the above-described tooth pattern 16 defines a respective tooth spacing measured between the tips of adjacent teeth, or if desired, measured between any of numerous other corresponding points between adjacent teeth. The tooth spacing is the inverse of the tooth pitch (i.e., 1/pitch). Thus, for example, an "18 pitch" tooth spacing is 1/18 or about 0.055 inch (1.4 mm) point to point between adjacent teeth. In the previously described embodiment, the tooth spacing is substantially constant throughout the tooth patterns 16. However, the tooth spacing may vary between teeth, and/or may vary according to a predetermined pattern among the teeth of the tooth pattern. In some embodiments, the first rake angle α may be determined, in part, based on the tooth pitch. For example, preferably, the leading tooth defines a relatively coarse pitch, the trailing tooth defines a relatively fine pitch, and the finer the pitch of the trailing tooth, the more negative is the rake angle of the leading tooth.

Each tooth pattern also defines a respective number of teeth per inch ("TPI"). The TPI of embodiments disclosed herein are preferably about 22 TPI or finer. In some embodiments the TPI is within the range of about 16 TPI to about 22 TPI, and, in other embodiments the TPI is within the range of about 12 TPI to about 16 TPI. In some embodiments, the first rake angle α may be determined, in part, based on the TPI. For example, with a tooth pitch of about 21 TPI or finer, the first rake angle α may be within the range of about −6° to about −9°, or preferably about −7°; or, for example, when the TPI is within the range of about 16 TPI to about 21 TPI, the first rake angle α may be within the range of about −4° to about −6°, or preferably about −5°; or, for example, when the tooth pitch is within the range of about 12 TPI to about 16 TPI, the first rake angle α may be within the range of about −1° to about −4°, or preferably about −3°. Further, in some embodiments, the pitch may not be constant within a pattern. For example, as indicated above, in some embodiments, the leading tooth defines a relatively coarse pitch, the trailing tooth defines a relatively fine pitch, and the finer the pitch of the trailing tooth, the more negative is the rake angle of the leading tooth.

As noted above, the teeth (20, 22, 24) include primary clearance surfaces (30, 38, 46) and respective included angles (32, 40, 48) between the clearance surfaces (30, 38, 46) and rake faces (28, 36, 44). Further, the primary clearance surfaces (30, 38, 46) also define primary clearance angles (50, 52, 54), which are defined from a plane extending between tips of consecutive similar teeth, i.e., the primary clearance angle 50 is the angle between the plane defined by tips of consecutive leading teeth 20 (e.g., the line $H_1$) and the primary clearance surface 30 of the respective leading tooth 20. Similarly, the primary clearance angles 52, 54 are defined by the angle between the plane defined by tips of consecutive trailing teeth 22, 24 (e.g., the line $H_2$) and the primary clearance surfaces 38, 46 of the respective trailing teeth 22, 24. As shown in FIG. 2, in the illustrated embodiment, the primary clearance angle 50 of the leading tooth 20 is greater than the primary clearance angle 52, 54 of the trailing teeth 22, 24. In some embodiments, the primary clearance angles 50, 52, 54 are each within the range of about 35° to about 50°.

Turning to FIGS. 3-5, tooth set profiles of repeating patterns of cutting teeth of recip blades embodying the invention are shown. The recip blades of FIGS. 3-5 are similar to the recip blade 10 of FIG. 1, and therefore like reference numerals preceded by the numeral "1" are used to indicate like elements in FIG. 3, like reference numerals preceded by the numeral "2" are used to indicate like elements in FIG. 4, and like reference numerals preceded by the numeral "3" are used to indicate like elements in FIG. 5. Accordingly, for example, in the embodiments of FIGS. 3, 4, and 5, the leading teeth 120, 220, and 320, respectively, each define a first rake angle that is more negative than the second rake angle of each of the trailing teeth in the respective embodiment.

Turning to FIG. 3, the tooth pattern 116 includes three consecutive cutting teeth. In the tooth pattern 116, a leading tooth 120 is followed by two consecutive trailing teeth 122 and 124, in the cutting direction "B". The tooth pattern 116 includes an unset leading tooth 120, followed by a set tooth 124 set to a first side of the blade 110 and a set tooth 124 set to a second side of the blade 110, with the first and second sides being on opposite sides of the blade 110 with respect to the cutting direction B. In this embodiment, the set $S_1$ of the trailing teeth 122, 124 is constant, i.e., the amount of set $S_1$ is the same for each tooth 122, 124, but each set tooth is set to a different side of the blade 110. As described above, the leading tooth 120 defines a height taller than the set teeth 122, 124. Further, the leading tooth 120 defines a first negative rake angle and the trailing set teeth 122, 124 define second less negative rake angles. Although shown with only two trailing teeth 122, 124, alternative embodiments may include any number of trailing teeth within a repeating pattern.

For example, with reference to FIG. 4, a blade 210 is shown with a repeating pattern 216 having a leading tooth 220, followed by two trailing teeth 222, 224 set to a first side of the blade 210, followed by an unset tooth 256, followed by two trailing teeth 258, 260 set to a second, and opposite side, of the blade 210 relative the first side of the blade. In the pattern 216 of FIG. 4, the teeth may define a variable set, i.e., the set teeth may have different sets. For example, as shown in FIG. 4, set tooth 222 defines a relatively light set $S_2$ and set tooth 224 defines a relatively heavy set $S_3$. Similarly, set tooth 258 defines the same relatively light set $S_2$ as the set tooth 222, and set tooth 260 defines the same relatively heavy set $S_3$ as the set tooth 224, but with each of the set teeth 258, 260 set to the opposite side of the blade 210 relative to the set teeth 222, 224.

In this exemplary embodiment, the leading tooth 220 and the trailing unset tooth 256 of the repeating pattern 216 are substantially the same and each defines a height taller than the set teeth 222, 224, 258, 260. Further, the leading tooth 220 and the trailing unset tooth 256 each define a first negative rake angle that is more negative than each of the second rake angles of the trailing teeth 222, 224, 258, 260. As such, the unset teeth, whether leading or trailing, preferably define more negative rake angles, and in some embodiments define taller heights, than the set teeth. In some embodiments, the heights of the set teeth 222, 224, 258, 260 are variable. For example, the relatively heavy set teeth 224, 260 may define lower heights than the relatively light set teeth 222, 258, respectively.

As another example, with reference to FIG. 5, a blade 310 includes a repeating pattern 316 having six consecutive teeth. The leading tooth 320 is unset, followed by two set teeth 322, 324, set to a first side of the blade 310, followed by a trailing unset tooth 356, followed by two set teeth 358, 360, set to a second side of the blade 310, which is opposite the first side of the blade 310. In the exemplary embodiment shown in FIG. 5, the set $S_4$ of the set teeth 322, 324, 358, 360 is constant, i.e., each tooth is set to the same level set $S_4$, with set teeth 322, 324 set to the first side of the blade, and set teeth 358, 360 set to the second side or opposite side of the blade.

In the exemplary embodiment of FIG. 5, similar to the embodiment of FIG. 4, the leading tooth 320 and the trailing unset tooth 356 are substantially the same and each defines a height taller than the respective set teeth 322, 324, 358, 360. Further, the leading tooth 320 and the trailing unset tooth 356 each define a negative rake angle that is more negative than the rake angles of the trailing teeth 322, 324, 358, 360. Again, as in the previously described embodiments, the unset teeth, whether leading or trailing, define first rake angles that are negative, and the trailing teeth define second rake angles that are less negative than the first rake angles. In the illustrated embodiment, the leading unset teeth preferably also define taller tooth heights prior to tooth set than the set trailing teeth.

Advantageously, embodiments of the present invention provide improvements over other constructions and/or configurations of recip blades. For example, faster cutting times and reduced burr, both in size and presence, may result from use of recip blades in accordance with embodiments of the invention. For example, with reference to FIG. 6, a chart is provided detailing the results of testing performed on recip blades embodying the invention. In FIG. 6, each blade tested had a repeating tooth pattern of six teeth. Each tooth pattern was defined by a leading tooth, followed by two left set teeth, a raker tooth, and then two right set teeth. This pattern is represented by the "Set Pattern" of "LLSRRS" wherein "L" represents a left set tooth, "R" represents a right set tooth, and "S" represents an unset tooth. Four recip blades were tested; two of the blades were constructed in accordance with embodiments of the invention; and two of the blades were constructed in accordance with prior art configurations. Groups 1 and 2 were recip blades constructed in accordance with embodiments of the invention where the blades defined repeating patterns of cutting teeth including an unset tooth defining a negative rake angle (−7°) followed by set trailing teeth defining less negative rake angles (0°); whereas the recip blades of Groups 3 and 4 included repeating patterns of cutting teeth where every tooth of the pattern was set with a negative rake angle (−7°). In addition, the recip blades of Groups 1 and 2 defined high-low tooth heights as described above, whereas the recip blades of Groups 3 and 4 did not, i.e., they defined constant tooth heights. In addition, the recip blades of Group 1 defined a variable set pattern, whereas the recip blades of Groups 2-4 defined constant set patterns, i.e., all set teeth defined the same level of set as the other set teeth of the respective blade. As such, the recip blades of Group 1 are similar to the embodiment of the recip blade described above in connection with FIG. 4, and the recip blades of Group 2 are similar to the embodiment of the recip blade described above in connection with FIG. 5. Each blade tested defined 21 TPI.

During testing, six cuts were made in a ¾" rigid conduit, and measurements were made for quality and speed of cut. Quality of cut was measured by the presence and size of burr produced on the inside and outside of the cut rigid conduit. Less burr and smaller burr size indicated a higher quality of cut. For example, relatively large inside burrs presented a chopping look to the cut. Six cuts were made with each blade configuration and using three different reciprocating saws: a Bosch reciprocating saw, a Milwaukee reciprocating saw, and a Hitachi reciprocating saw.

As shown in FIG. 6, Groups 1 and 2 provided improved cutting times, with both blades providing about 1 second or more faster cutting time than the blade of Group 4, which represents about a 20% or more improvement in cutting time, and as compared to Group 3, represents about a 5% or more improvement in cutting time.

With respect to quality, two types of measurements were made. First, each cut that was made through the conduit was inspected for the presence of burr on the inside and outside of the conduit. If burr was present, the length and width was measured. FIG. 6 shows that Group 2 provided the highest quality of cut in terms of presence of burr, with zero (0) samples having inside burr and 17 samples having outside burr. Group 1 performed similarly well, with only 2 samples having inside burr and 18 samples having outside burr. This is in contrast to Groups 3 and 4, which had 14 and 30 samples having burrs on the inside diameter, respectively, and 23 and 29 samples having burrs present on the outside diameter, respectively. These test results are represented graphically in FIG. 7 for inside burr presence.

Figure 8:
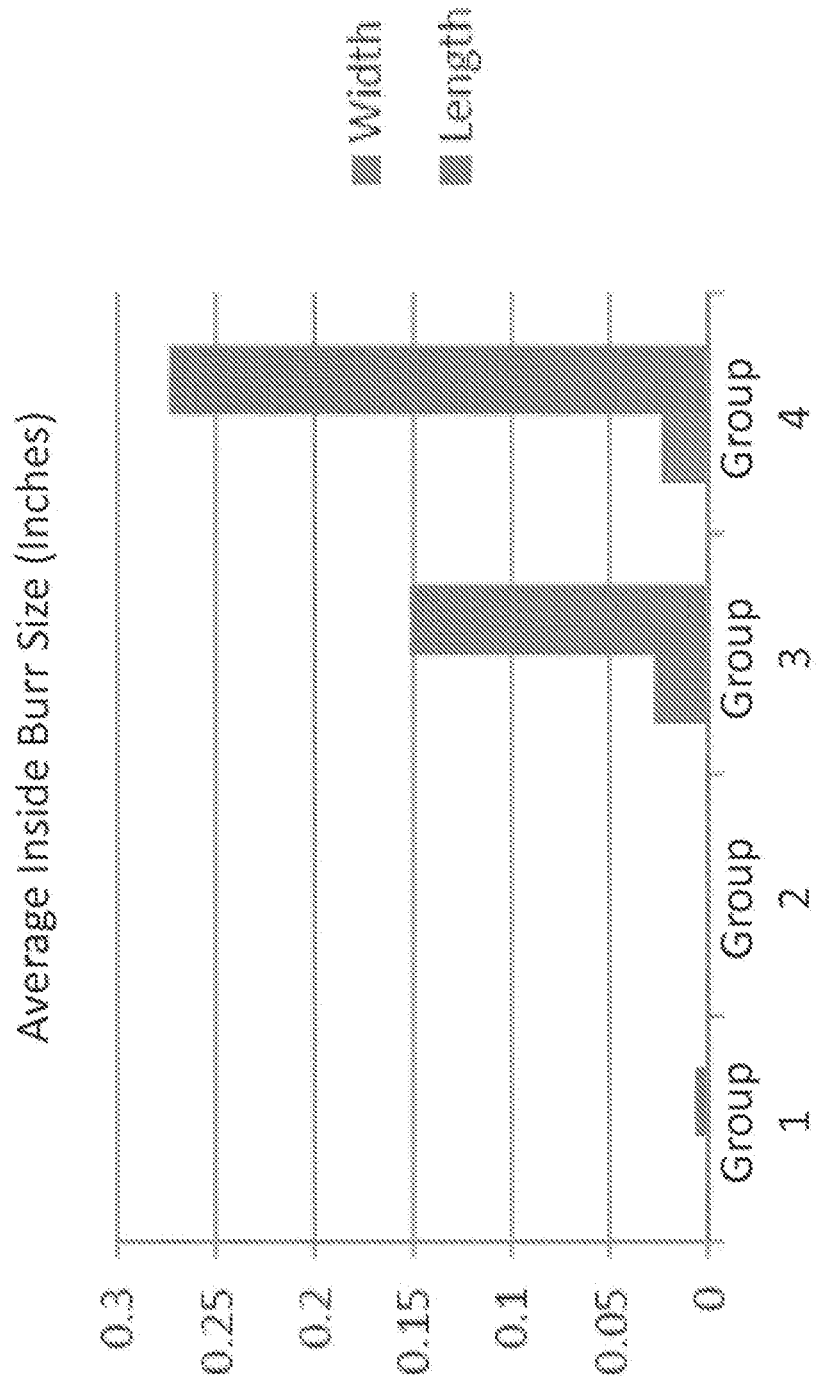
FIG. 8 is a graphical representation of data presented in FIG. 6 with respect to the size of burr produced during testing.

With respect to the sizes of the burrs, Group 2 provided the smallest burr size, with zero measurable burr present on the inside diameter of all the samples, and an outside burr defining an average length of 0.155 inches and an average width of 0.026 inches. Group 1 similarly produced small burr sizes, with inside burrs defining a length of 0.006 inches and an average width of 0.001 inches, and an outside burr defining a length of 0.148 inches and an average width of 0.021 inches. In contrast, Groups 3 and 4 provided relatively larger size burr. Group 3 produced an inside burr having a length of 0.152 inches and a width of 0.027 inches, and an outside burr with a length of 0.259 inches and a width of 0.037 inches. Group 4 produced an inside burr having a length of 0.274 inches and a width of 0.024 inches, and an outside burr having a length of 0.244 inches and a width of 0.037 inches. These test results are represented graphically in FIG. 8 for inside burr size.

Accordingly, in view of this testing, embodiments of the present invention can provide significant improvements in both cutting times and reduced burr.

As may be recognized by those of ordinary skill in the pertinent art based on the teachings herein, numerous changes and modifications can be made to the above-described and other embodiments of the present invention without departing from the scope of the invention as defined in the appended claims. For example, any of the variables (rake angle, tooth height, tooth pitch, TPI, clearance angles, included angles, tooth set, etc.) may be changed as desired or otherwise required, and/or any of numerous different patterns, variable or constant, that are currently known, or that later become known, equally may be employed. Further, for example, the teeth of the recip blades disclosed herein may be carbide tipped or may define any of numerous different constructions that are currently known, or that later become known, including bi-metal or other constructions. Further, the recip blades of the present invention may be coated with any of numerous different coatings that are currently known or that later become known, such as a titanium nitride coating (TiN), aluminum titanium nitride (AlTiN), or combinations thereof, or the saw blades may not include any coating at all. Numerous other features of the saw blades disclosed herein may be changed as desired, or otherwise as required to meet the requirements of a particular application. Accordingly, this detailed description of currently preferred embodiments is to be taken in an illustrative, as opposed to a limiting sense.

What is claimed is:

1. A reciprocating saw blade comprising:
a blade body; and
a cutting edge provided along one edge of the blade body and defining a cutting direction, the cutting edge comprising a repeating pattern of cutting teeth, wherein each repeating pattern comprises:
a leading tooth with respect to the cutting direction, the leading tooth comprising:
a first tooth tip defining a first tooth height; and
a first rake face defining a first negative rake angle; and
a first trailing tooth following the leading tooth with respect to the cutting direction, the first trailing tooth comprising:
a second tooth tip defining a second tooth height that is less than the first tooth height; and
a second rake face defining a second rake angle that is greater than the first rake angle.

2. The reciprocating saw blade of claim 1, wherein the cutting teeth define a tooth pitch of at least 12 teeth per inch.

3. The reciprocating saw blade of claim 1, wherein the leading tooth and one or more teeth that follow the leading tooth with respect to the cutting direction define a first tooth pitch having a first number of teeth per inch and the first trailing tooth and one or more teeth that follow the first trailing tooth with respect to the cutting direction define a second tooth pitch having a second number of teeth per inch that is greater than the first number of teeth per inch.

4. The reciprocating saw blade of claim 1, wherein the second rake angle is a negative angle.

5. The reciprocating saw blade of claim 1, wherein each repeating pattern further comprises a second trailing tooth disposed between the first trailing tooth and the leading tooth with respect to the cutting direction, the second trailing tooth comprising:
a third tooth tip defining a third tooth height; and
a third rake face defining a third rake angle that is greater than the first rake angle,
wherein the third tooth height is less than the first tooth height.

6. The reciprocating saw blade of claim 5, wherein the third tooth height is equal to the second tooth height and wherein the third rake angle is equal to the second rake angle.

7. The reciprocating saw blade of claim 5, wherein the leading tooth is an unset tooth with respect to the cutting direction, the first trailing tooth is set to a first side of the blade body with respect to the cutting direction at a first distance, and the second trailing tooth is set to a second side of the blade body opposite the first side at a second distance.

8. The reciprocating saw blade of claim 7, wherein the first distance and the second distance are equal.

9. The reciprocating saw blade of claim 5, wherein the leading tooth is an unset tooth with respect to the cutting direction, the first trailing tooth is set to a first side of the blade body with respect to the cutting direction at a first distance, and the second trailing tooth is set to the first side of the blade body at a second distance.

10. The reciprocating saw blade of claim 9, wherein the first distance and the second distance are equal.

11. The reciprocating saw blade of claim 1, wherein the leading tooth further comprises a first primary clearance surface extending from the first tooth tip at a first primary clearance angle,
wherein the first trailing tooth further comprises a second primary clearance surface extending from the second tooth tip at a second primary clearance angle, and
wherein the first primary clearance angle is greater than the second primary clearance angle.

12. The reciprocating saw blade of claim 1, wherein the leading tooth further comprises a first primary clearance surface extending from the first tooth tip and a first included angle between the first rake face and the first primary clearance surface,
  wherein the first trailing tooth further comprises a second primary clearance surface extending from the second tooth tip and a second included angle between the second rake face and the second primary clearance surface, and
  wherein the first included angle is greater than the second included angle.

13. The reciprocating saw blade of claim 1, wherein
  the cutting teeth define a tooth pitch of at least 12 teeth per inch,
  the leading tooth includes a first primary clearance surface extending from the first tooth tip and a first included angle between the first rake face and the first primary clearance surface, and
  the trailing tooth includes a second primary clearance surface extending from the second tooth tip and a second included angle between the second rake face and the second primary clearance surface, wherein the first included angle is greater than the second included angle.

14. The reciprocating saw blade of claim 13, wherein each repeating pattern further comprises a second trailing tooth disposed between the trailing tooth and the leading tooth with respect to the cutting direction, the second trailing tooth comprising:
  a third tooth tip defining a third tooth height that is less than the first tooth height;
  a third rake face defining a third rake angle; and
  a third primary clearance surface extending between the third tooth tip and a third included angle between the third rake face and the third primary clearance surface, wherein the third included angle is less than the first included angle.

15. The reciprocating saw blade of claim 14, wherein the third rake angle is less than the first rake angle.

16. The reciprocating saw blade of claim 14, wherein the leading tooth is an unset tooth with respect to the cutting direction, the trailing tooth is set to a first side of the blade body with respect to the cutting direction at a first distance, and the second trailing tooth is set to a second side of the blade body opposite the first side at a second distance.

17. The reciprocating saw blade of claim 14, wherein the leading tooth is an unset tooth with respect to the cutting direction, the trailing tooth is set to a first side of the blade body with respect to the cutting direction at a first distance, and the second trailing tooth is set to the first side of the blade body at a second distance.

18. The reciprocating saw blade of claim 1, wherein the first rake face is configured to enhance life of the saw blade, and the second rake face is configured to reduce the size of burrs generated when cutting a metal work piece.

19. The reciprocating saw blade of claim 18, wherein the leading tooth further comprises a first primary clearance surface extending from the first tooth tip and a first included angle between the first rake face and the first primary clearance surface,
  wherein the first trailing tooth further comprises a second primary clearance surface extending from the second tooth tip and a second included angle between the second rake face and the second primary clearance surface, and
  wherein the first included angle is greater than the second included angle.

20. The reciprocating saw blade of claim 18, wherein the leading tooth is an unset tooth, wherein the first trailing tooth comprises a plurality of trailing teeth, wherein at least a first one of the plurality of trailing teeth is set to a first side of the blade body with respect to the cutting direction at a first distance and at least a second one of the plurality of trailing teeth is set to a second side of the blade body with respect to the cutting direction at a second distance, wherein the first side is opposite of the second side.

* * * * *